United States Patent [19]

Sharangpani et al.

[11] Patent Number: 5,367,650
[45] Date of Patent: Nov. 22, 1994

[54] METHOD AND APPARAUTS FOR PARALLEL EXCHANGE OPERATION IN A PIPELINED PROCESSOR

[75] Inventors: Harshvardhan P. Sharangpani, Santa Clara; Jonathan B. Sweedler, Sunnyvale, both of Calif.

[73] Assignee: Intel Corporation, Santa Clara, Calif.

[21] Appl. No.: 923,148

[22] Filed: Jul. 31, 1992

[51] Int. Cl.[5] .......................... G06F 9/24; G06F 9/38; G06F 12/00; G06F 15/00
[52] U.S. Cl. .................................. 395/375; 395/400; 395/775; 395/800; 364/231.8; 364/256.4; 364/260; 364/260.2; 364/262.4
[58] Field of Search ............... 395/400, 425, 800, 375, 395/775

[56] References Cited

U.S. PATENT DOCUMENTS

| | | | |
|---|---|---|---|
| 4,704,679 | 11/1987 | Hassler et al. | 395/400 |
| 4,807,185 | 2/1989 | Kamiya | 395/725 |
| 4,835,729 | 5/1989 | Morton | 395/800 |
| 5,001,629 | 3/1991 | Murakami et al. | 395/375 |
| 5,107,457 | 4/1992 | Hayes et al. | 395/800 |
| 5,179,734 | 1/1993 | Candy et al. | 395/800 |
| 5,241,679 | 8/1993 | Nakagawa et al. | 395/425 X |
| 5,243,701 | 9/1993 | Muramatsu et al. | 395/325 |
| 5,269,012 | 12/1993 | Nakajima | 395/425 |

*Primary Examiner*—Joseph L. Dixon
*Assistant Examiner*—Michael A. Whitfield
*Attorney, Agent, or Firm*—Blakely, Sokoloff Taylor & Zafman

[57] ABSTRACT

A data register file system is provided in a microprocessor having a pipelined execution unit that employs the data register file to store operands and results of its instruction executions. The data register file system includes a plurality of data registers, each of which stores one of the operands and results. A pointer table has a plurality of pointer registers, each storing an address of one of the data registers. A first address generation logic is coupled to the pointer table and the pipelined execution unit for generating a first set of pointer table addresses to access a first group of the pointer registers for the addresses of a first group of the data registers which are required by the execution of a first floating point instruction. The first address generation logic services the first floating point instruction A second address generation logic is coupled to the pointer table and the pipelined execution unit for generating a second set of pointer table addresses to access a second group of the pointer registers for the addresses of a second group of the data registers which are required by the execution of a second instruction. The second address generation logic is provided specifically to facilitate the issue and execution of the second floating point instruction in parallel with the first floating point instruction The second instruction is an exchange instruction that requires an exchange of contents stored in the second group of data registers. A circuit is coupled to the pointer table and the data registers for coupling the addresses of the first group of the data registers to the data registers for accessing the first group of the data registers. A read circuit is coupled to the pointer table for reading the addresses of the second group of the data registers. An exchange circuit is coupled to the read circuit for exchanging the addresses read from the second group of the pointer registers and writing the addresses exchanged back to the second group of the pointer registers. The second instruction is issued and executed in parallel with the first instruction. A method of executing the exchange instruction in parallel with other instructions in the data register file system is also described.

22 Claims, 7 Drawing Sheets

Pipeline Stages →

| Clocks | D2 | E | X₁ | X₂ | WF | ER |
|---|---|---|---|---|---|---|
| 1 | FADD | | | | | |
| 2 | FXCH | FADD | | | | |
| 3 | FST | FXCH | FADD | | | |
| 4 | | FST | FXCH | FADD | | |
| 5 | | | FST | FXCH | FADD | |
| 6 | | | | FST | FXCH | FADD |
| 7 | | | | | FST | FXCH |
| 8 | | | | | | FST |

| Stack Position | Pointer Table File | Physical Register | | Programmer Stack | |
|---|---|---|---|---|---|
| ST4 PT0(000) | 000 (R0) → | R0(000) | N/A | A | ST0 |
| ST5 PT1(001) | 001 (R1) → | R1(001) | N/A | B | ST1 |
| ST6 PT2(010) | 010 (R2) → | R2(010) | N/A | C | ST2 |
| ST7 PT3(011) | 011 (R3) → | R3(011) | N/A | D | ST3 |
| TOS→ PT4(100) | 100 (R4) → | R4(100) | A | | |
| ST1 PT5(101) | 101 (R5) → | R5(101) | B | | |
| ST2 PT6(110) | 110 (R6) → | R6(110) | C | | |
| ST3 PT7(111) | 111 (R7) → | R7(111) | D | | |

Figure 6b

| Stack Position | Pointer Table File | Physical Register | | Programmer Stack | |
|---|---|---|---|---|---|
| ST4 PT0(000) | 000 (R0) → | R0(000) | N/A | | |
| ST5 PT1(001) | 001 (R1) → | R1(001) | N/A | ? | ST0 |
| ST6 PT2(010) | 010 (R2) → | R2(010) | N/A | B | ST1 |
| ST7 PT3(011) | 011 (R3) → | R3(011) | N/A | C | ST2 |
| TOS→ PT4(100) | 100 (R4) → | R4(100) | ? | D | ST3 |
| ST1 PT5(101) | 101 (R5) → | R5(101) | B | | |
| ST2 PT6(110) | 110 (R6) → | R6(110) | C | | |
| ST3 PT7(111) | 111 (R7) → | R7(111) | D | | |

Figure 6c

| Stack Position | Pointer Table File | Physical Register | | Programmer Stack | |
|---|---|---|---|---|---|
| ST4 PT0(000) | 000 (R0) → | R0(000) | N/A | | |
| ST5 PT1(001) | 001 (R3) → | R1(001) | N/A | C | ST0 |
| ST6 PT2(010) | 010 (R2) → | R2(010) | N/A | B | ST1 |
| ST7 PT3(011) | 011 (R1) → | R3(011) | N/A | ? | ST2 |
| TOS→ PT4(100) | 110 (R4) ⤫ | R4(100) | ? | D | ST3 |
| ST1 PT5(101) | 101 (R5) | R5(101) | B | | |
| ST2 PT6(110) | 100 (R6) | R6(110) | C | | |
| ST3 PT7(111) | 111 (R7) → | R7(111) | D | | |

Figure 6d

| Stack Position | Pointer Table File | Physical Register | | Programmer Stack | |
|---|---|---|---|---|---|
| ST3 PT0(000) | 000 (R0) → | R0(000) | N/A | | |
| ST4 PT1(001) | 001 (R3) → | R1(001) | N/A | | |
| ST5 PT2(010) | 010 (R2) → | R2(010) | N/A | B | ST0 |
| ST6 PT3(011) | 011 (R1) → | R3(011) | N/A | X | ST1 |
| ST7 PT4(100) | 110 (R4) ⤫ | R4(100) | X | D | ST2 |
| TOS→ PT5(101) | 101 (R5) | R5(101) | B | | |
| ST1 PT6(110) | 100 (R6) | R6(110) | N/A | | |
| ST2 PT7(111) | 111 (R7) → | R7(111) | D | | |

| | Pipeline Stages → | | | | | |
|---|---|---|---|---|---|---|
| Clocks | D2 | E | $X_1$ | $X_2$ | WF | ER |
| 1 | FADD (u) (v) FXCH | | | | | |
| 2 | FST | FADD (u) (v) FXCH | | | | |
| 3 | | FST | FADD (u) (v) FXCH | | | |
| 4 | | | FST | FADD (u) (v) FXCH | | |
| 5 | | | | FST | FADD (u) (v) FXCH | |
| 6 | | | | | FST | FADD (u) (v) FXCH |
| 7 | | | | | | FST |

Figure 7

METHOD AND APPARAUTS FOR PARALLEL EXCHANGE OPERATION IN A PIPELINED PROCESSOR

FIELD OF THE INVENTION

The present invention pertains to the field of microprocessors. More particularly, this invention relates to a method and apparatus for parallel executing instructions in a pipelined processor having a data register file with stack organization.

BACKGROUND OF THE INVENTION

In a prior microprocessor that includes a floating point unit, data for floating point operations is typically stored in a physical data register file. The data register file includes a plurality of registers numbered consecutively. These registers are not addressed directly by instruction opcodes, but rather as a stack. When data is stored in such data register file, all data accesses by the floating point unit can be addressed with respect to the position of the data register in the stack relative to a given register called the stack top register. A top-of-stack (TOS) pointer is employed to point at the data register which is currently chosen as stack top. The TOS pointer is contained in a status word register of the floating point unit. All data operations are performed in connection with the TOS address. Each of the instructions to the data register file always has its first source operand implicitly in the stack top. The address to the second operand, if any, is specified as an offset or index off the stack top. In this way, the actual register address or number to the second operand has to be obtained by adding this offset or index to the register number of the register which is indicated as current stack top.

FIG. 1 illustrates a prior data register file 12 that can be addressed as a stack. In FIG. 1, data register file 12 includes eight registers $R_0$ through $R_7$. Registers $R_0$–$R_7$ are numbered consecutively (i.e., from 000–111) and are accessed by stack addressing. A TOS (i.e., top of stack) pointer 16 of a status word register provides a three-bit address for data registers $R_0$–$R_7$, indicating which is currently stack top STO. TOS pointer 16 supplies its top of stack address to address generating logic 24.

In addition to the top of stack address from TOS pointer 16, address generating logic 24 also receives stack addresses from a stack address field 18. The stack address field 18 is used to provide logical stack addresses of instruction operands and destination for an instruction. Address generating logic 24 then combines the stack addresses of an instruction with the top of stack address to generate the actual register numbers to data register file 12 via line 20. The stack addresses are offsets or indexes off the top of stack address.

The instructions to data register file 12 each typically has its first source operand implicitly stored in the stack top register. The stack address to the second operand, if any, is specified as a three bit value or index off the stack top. In this way, the actual register number of the register that stores the second operand needs to be obtained by adding the index to the register number of the register which is indicated by the top of stack address as current stack top.

TOS pointer 16 is contained in a TOS update logic 30. TOS update logic 30 updates TOS pointer 16 with a new top of stack address, whenever necessary. TOS update logic 30 is controlled by a microcontrol stack field 26. Stack field 26 contained in some microcontrol vectors provides control directives to TOS update logic 30 for updating TOS pointer 16.

In the data register file as described above, the stack top ST0 is most heavily used. This is because a single operand instruction must operate upon the stack top ST0 and replaces it with a result. A two-operand instruction always uses the stack top ST0 for one of the two operands while the other operand is accessed with an offset added to the top of stack address. The result from the two-operand instruction is then written back to either the stack top ST0 or the other register. A load from memory instruction loads an operand from memory into the stack top ST0. A store to memory instruction reads an operand from the stack top ST0. An FXCH instruction exchanges the content of the stack top register with the content stored in a second register. Therefore, the stack top ST0 is used the most frequently.

Thus, for the prior microprocessor having the prior data register file, a source operand must typically be brought to the stack top ST0 before an instruction can operate upon it. In many cases, this requires an FXCH instruction to bring the desired data to the stack top. The addition of the FXCH instruction directly impacts the efficiency and throughput of the prior microprocessor.

In addition, the execution of the FXCH instruction in the prior art as shown in FIG. 1 is not efficient. The FXCH instruction exchanges the actual data. This typically requires the data to be available before the FXCH can be executed. If the data is unavailable, the FXCH instruction is required to wait for the data to be available. Also, on the prior art, the FXCH instruction (and, in fact, all floating point instructions) is required to wait for all previous instructions to complete.

It is to be noted that the execution of the FXCH instruction in the prior microprocessor is accomplished by exchanging actual data. In this case, an inefficiency will be incurred due to the fact that the FXCH instruction is required to stall until both operands are available. This inefficiency arises regardless of whether the execution hardware is pipelined.

For example, let us examine an FADD instruction that adds the top two operands in the stack and, after the add operation, another FADD instruction needs to be executed. The instruction stream generated to accomplish this task may look like the following:

| FADD | ST0, ST1 |
| FXCH | ST0, ST2 |
| FADD | ST0, ST3 | in which the first FADD instruction adds the operands in the ST0 and ST1 registers together and stores the result back to the stack top ST0. The second FXCH instruction then exchanges the operand in the stack top ST0 with the operand in the ST2 register. The third FADD instruction then adds the operands in the stack top ST0 and ST3 register together and stores the result back to the ST0.

As can be seen from FIG. 2, the FADD and the FXCH instructions cannot be overlapped in execution. The FADD instruction begins its execution during clock 1 and finishes execution and returns its result to the stack top ST0 during clock 5. It is not until after clock 5 that the result of the FADD instruction is available in the stack top ST0. Since the stack top ST0 does not have the result until after clock 5, the FXCH exchange instruction cannot be executed until the stack top ST0 receives a value. In this case, the FXCH instruction cannot begin execution at clock 2 as is necessary in a prior pipelined microprocessor. The FXCH instruction, in this case, must wait until clock 6 at which time the stack top ST0 has the result of the preceding FADD instruction. Stalling the FXCH instruction dramatically decreases instruction throughput of the prior pipelined microprocessor. As a matter of fact, the advantages of pipelining the instruction executions are lost in the prior pipelined microprocessor in situations such as described above where a subsequent instruction cannot begin execution until after a prior instruction has completed execution and has released the top of stack register. Note that the throughput in this case is adversely affected not by true data dependencies, but rather by artificial dependencies created by re-use of the same stack top register.

SUMMARY AND OBJECTS OF THE INVENTION

One of the objects of the present invention is to provide means and a method for increasing instruction execution throughput in a pipelined microprocessor having a data register file with stack organization.

Another object of the present invention is to provide means and a method for allowing instructions to be executed in parallel with other instructions in a pipelined microprocessor having a data register file with stack organization.

Another object of the present invention is to provide means and a method for allowing superscalar execution of the exchange instruction in parallel with other instructions in a pipelined microprocessor with relatively limited enhancement to the microarchitecture of the pipelined microprocessor having a data register file with stack organization.

A data register file system is provided in a microprocessor having a pipelined execution unit that employs the data register file to store operands and results of its instruction executions. The data register file system includes a plurality of data registers, each storing one of the operands or results. A pointer table is provided to include a plurality of pointer registers for storing addresses of the data registers, each pointer register storing an address of one of the data registers. A first address generation logic is coupled to the pointer table and the pipelined execution unit for generating a first set of pointer table addresses to access a first group of the pointer registers of the pointer table for the addresses of a first group of the data registers whose contents are required by the execution of a first floating point instruction, wherein the first address generation logic receives a first instruction address of the first floating point instruction from the pipelined execution unit to generate the first set of pointer table addresses. A second address generation logic is coupled to the pointer table and the pipelined execution unit for generating a second set of addresses to access a second group of the pointer registers for the pointer table addresses of a second group of the data registers whose contents are required by the execution of a second floating point instruction. The second address generation logic is also coupled to the first address generation logic. The second address generation logic receives a second instruction address of the second floating point instruction from the pipelined execution unit to generate the second set of pointer table addresses. The second instruction is an exchange instruction that requires an exchange of the contents stored in the second group of data registers. A circuit is coupled to the pointer table and the data registers for coupling the addresses of the first group of the data registers stored in the first group of the pointer registers to the data registers for accessing the first group of the data registers. A read circuit is coupled to the pointer table for reading the addresses of the second group of the data registers stored in the second group of the pointer registers. An exchange circuit is coupled to the read circuit for exchanging the addresses read from the second group of the pointer registers and writing the addresses exchanged back to the second group of the pointer registers. The addresses of the second group of the data registers stored in the second group of the pointer registers are exchanged in the second group of the pointer registers. The contents of the second group of the data registers remain unchanged. The second instruction is issued and executed in parallel with the first instruction.

A method of executing a floating point exchange instruction in parallel with other instructions in a microprocessor having a pipelined execution unit that employs a data register file to store operands and results of its instruction executions is described. The data register file includes a plurality of data registers. The method, in one embodiment, comprises the steps of:

(A) providing a plurality of pointer registers for storing addresses of the data registers, wherein each of the pointer registers stores an address of one of the data registers;

(B) receiving a first floating point instruction in a first address generation logic and a second floating point instruction in a second address generation logic, wherein the first floating point instruction is an instruction other than the exchange instruction, wherein the second floating point instruction is the exchange instruction;

(C) generating in the first address generation logic a first set of pointer table addresses to the pointer registers to access a first group of the pointer registers for the addresses of a first group of the data registers whose contents are required for the execution of the first floating point instruction in the pipelined execution unit, wherein the first group of the pointer registers include a pointer register pointed by a top of stack pointer;

(D) generating in the second address generation logic a second set of pointer table addresses to access a second group of the pointer registers for the addresses of a second group of the data registers whose contents are required for the execution of the exchange instruction which was issued in parallel with the first floating point instruction, wherein the second group of pointer registers include the pointer register pointed by the top of stack pointer and a second pointer register, wherein the execution of the exchange instruction requires an exchange of the contents stored in the second group of data registers;

(E) coupling the addresses of the first group of the data registers stored in the first group of the pointer registers and accessed with the first set of pointer table addresses to the data register file for accessing the first group of the data registers;

(F) reading the addresses of the second group of the data registers stored in the pointer register pointed by the top of stack pointer and the second pointer register of the second group of the pointer registers and accessed with the second set of pointer register addresses; and (G) exchanging the addresses read from the second group of the pointer registers and writing the addresses exchanged back to the second group of the pointer registers by (1) storing the address read from pointer register pointed by the top of stack pointer into the second pointer register; and (2) storing the address read from the second pointer register into the pointer register pointed by the top of stack pointer, wherein the contents of the second group of the data registers remain not exchanged, wherein the exchange instruction is executed in parallel with the first instruction.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which:

FIG. 5 is a stage diagram illustrating overlapped execution of instructions in the floating point unit having the floating point register file of FIG. 3;

FIGS. 6a-6b are exemplary illustrations of the floating point register file of FIG. 3 during the parallel execution of instructions;

FIG. 7 is another stage diagram illustrating parallel execution of instructions in the floating point unit having the floating point register file of FIG. 3.

DETAILED DESCRIPTION

Figure 1:
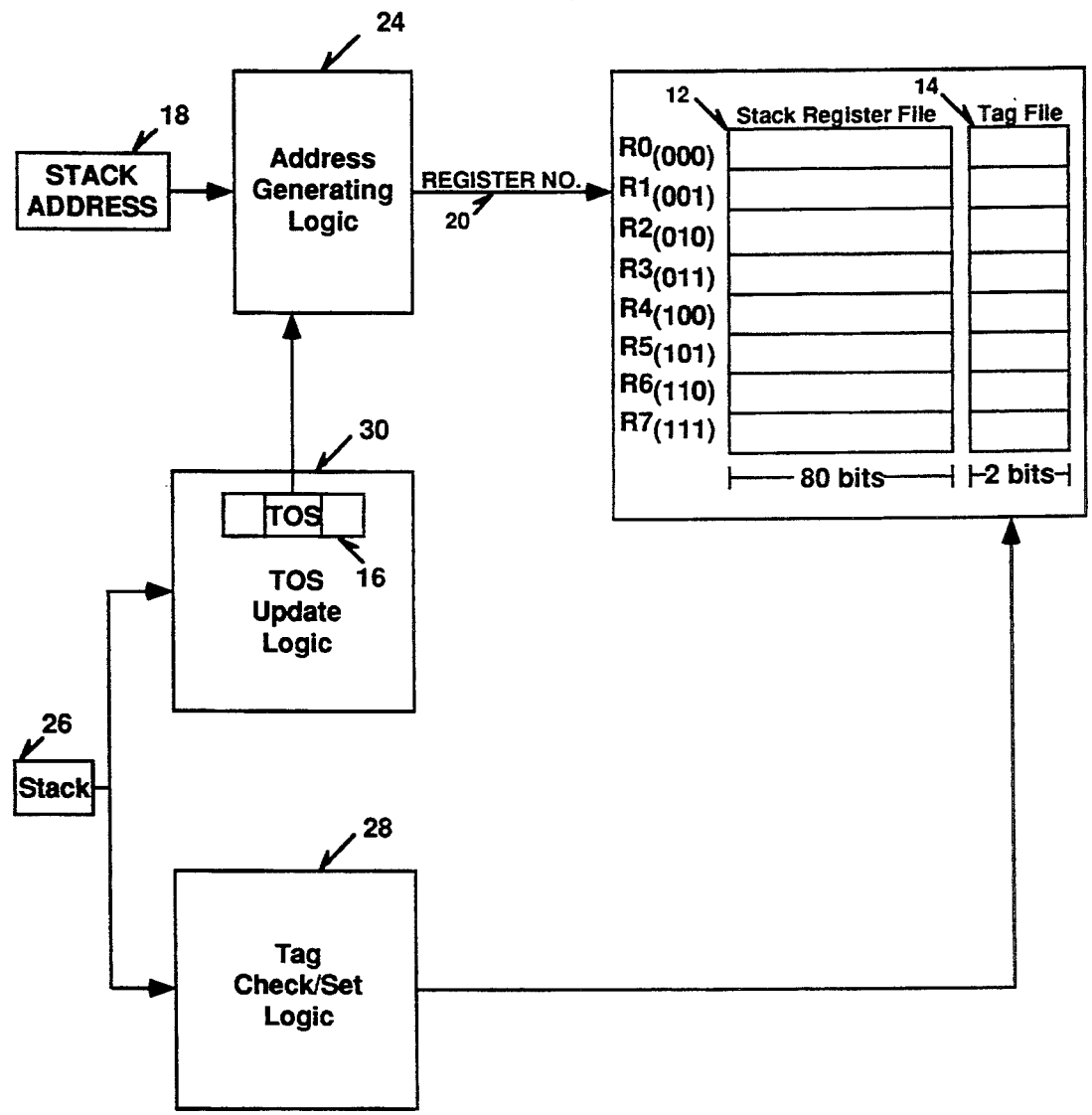
FIG. 1 is a block diagram of one prior art data register file with stack organization and its stack manipulation unit.
Figure 2:
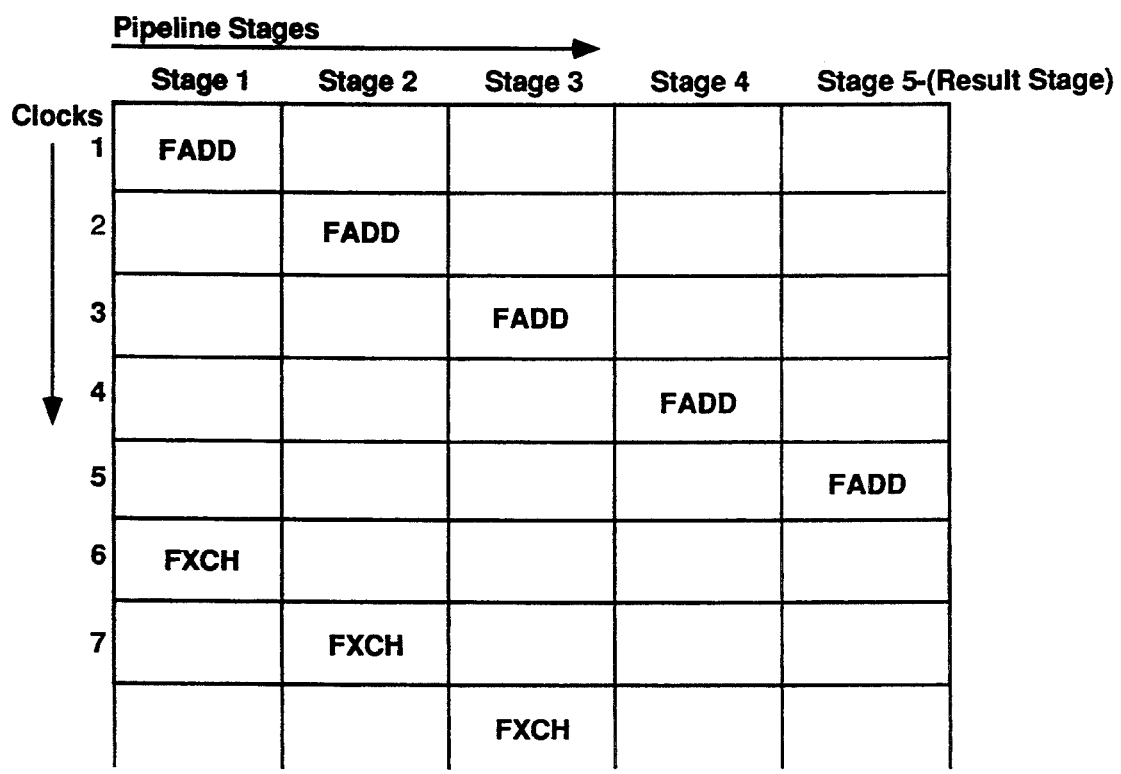
FIG. 2 is a stage diagram showing a plurality of execution stages for instructions in a pipelined microprocessor which implements the prior art data register file of FIG. 1.
Figure 3:
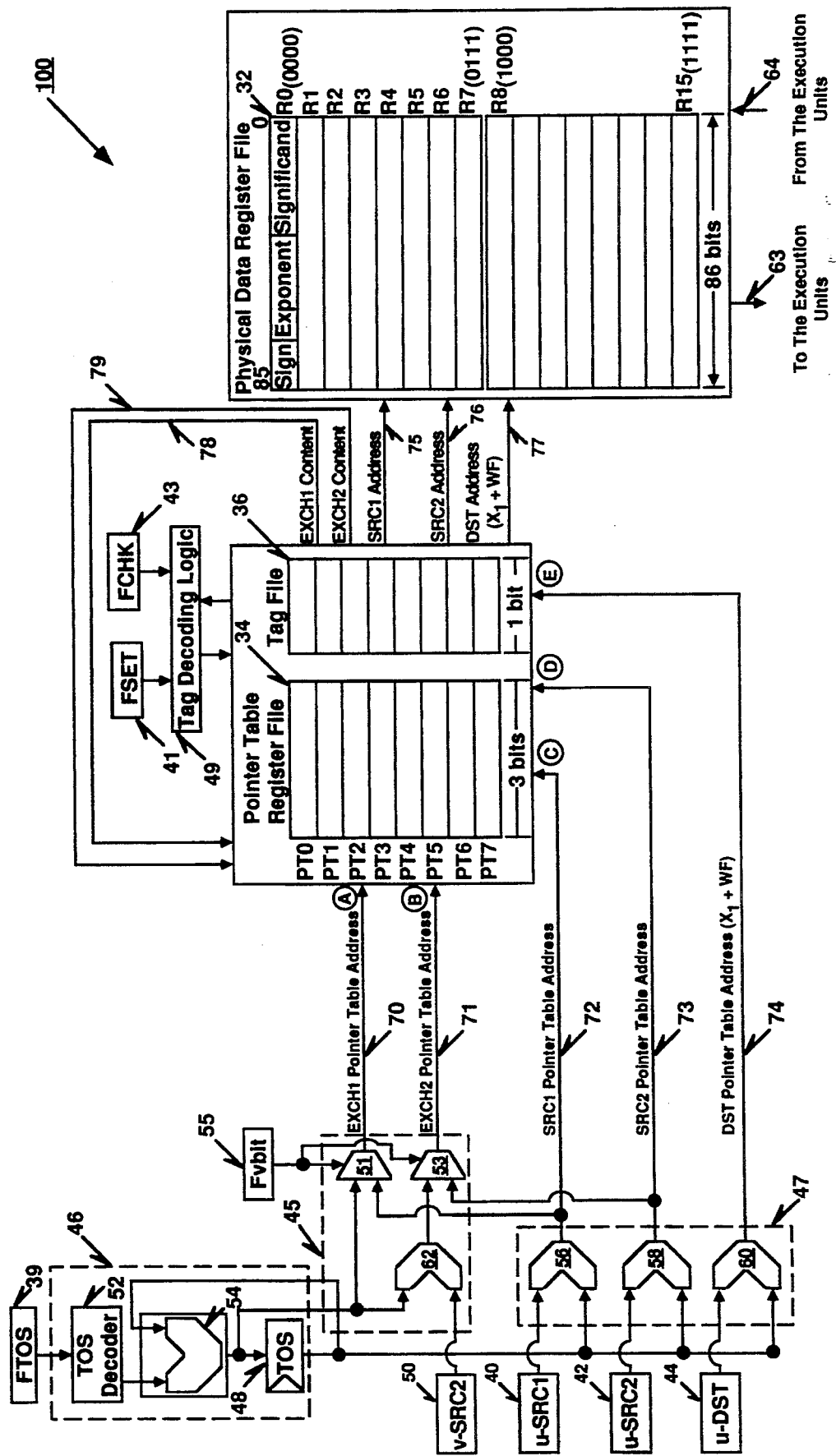
FIG. 3 is a block diagram of a floating point register file of a floating point unit of a pipelined microprocessor, including a pointer table, a top of stack address generator, a first address generation logic which is referred to as u-pipe address generation logic, and a second address generation logic which is referred to as v-pipe address generation logic.

FIG. 3 schematically illustrates in block diagram form a floating point register file 100 in a floating point unit of a microprocessor (both are not shown), which implements a preferred embodiment of the present invention.

In the presently preferred embodiment, the microprocessor is a pipelined microprocessor. The microprocessor includes a plurality of functional units (not shown), each of which is responsible for a particular task in the execution of instructions. Functionally speaking, the functional units typically include a bus interface unit for interfacing the microprocessor with external buses (also not shown), a decode unit for decoding instruction, a cache unit for storing data and instructions for execution, an integer execution unit for instruction execution, and a floating point unit for performing floating point operations. In addition, the functional units of the microprocessor may also include a memory management unit for managing data stored in the cache unit. Moreover, the cache unit may comprise a data cache unit and an instruction cache unit. It shall be noted, however, that the functional units are not limited to the above-mentioned units. The microprocessor may include other units.

In the presently preferred embodiment, the microprocessor employs BICMOS circuitry.

In order to speed up instruction execution, the pipelined microprocessor includes two execution pipes (i.e., routes), and has duplication of several execution units to accommodate the issuing and execution of two instructions at a time. One of the two pipes is referred to as u-pipe and the other is referred to as v-pipe. Each pipeline contains its own set of address generation logic, arithmetic logic and memory interfaces. Thus, the microprocessor is capable of executing at least two integer instructions in each clock.

In the presently preferred embodiment, the floating point unit of the pipelined microprocessor includes a plurality of floating point execution units and floating point register file 100 of FIG. 3 for floating point operations. Floating point register file 100 stores the operands of the floating point instructions that are to be executed in the floating point execution units and the results of their executions. FIG. 3 only illustrates floating point register file 100.

The floating point unit of the microprocessor of the presently preferred embodiment is capable of performing operations such as addition, subtraction, multiplication and division as well as various other operations. The floating point execution units in the floating point unit can load and store values (i.e., operands) to and from registers in register file 100.

The floating point unit is coupled to other functional units of the microprocessor via a 64 bit wide bus (not shown). The bus includes a u-pipe bus and a v-pipe bus. The floating point unit receives its input data from the other functional units via the bus and sends its output data to other functional units via the bus. The floating point unit receives a first instruction in the u-pipe and a second instruction in the v-pipe. The floating point unit never receives an instruction only in the v-pipe and not in the u-pipe.

The floating point unit of the microprocessor also includes a pipelined instruction execution unit in order to increase instruction throughput. The instruction execution in the floating point unit is divided into several pipeline stages where each stage executes only a portion of an instruction. Each stage takes only a fraction of the entire execution time necessary to execute a complete instruction. An instruction enters the pipeline at the first stage and proceeds to subsequent stages at each clock until it reaches the last stage where results and/or errors are reported.

In the presently preferred embodiment, the pipeline in the floating point unit is divided into eight pipeline stages: a prefetch stage (PF), a first decode and microinstruction vector issue stage (D1), a second decode stage (D2), a memory and register file read stage (E), a first execute stage (X1), a second execute stage (X2), a rounding and floating point write stage (WF), and an internal special situation report stage (ER). FIG. 5 illustrates some of the eight stages, which will be described in more detail below.

The E stage in the floating point unit pipeline is used to access memory and to read the floating point register file 100 of FIG. 3. However, no operation other than data transfer operation takes place at the E stage. The X1 stage is the first execution stage and is sometimes used to write results into floating point register file 100. The X2 stage is the second execution stage of the floating point unit pipeline. It is in the X1 and X2 stages that arithmetic floating point operations take place. Instructions that do not write their results into floating point register file 100 in the X1 stage perform rounding and write their results into register file 100 in the WF stage. The ER stage is employed only for error handling. It shall be noted that the floating point unit is not activated during the PF and D1 stages.

For example, an FADD instruction, which is a floating point add instruction, performs a floating point decoding at the D2 stage. At the E stage, the FADD instruction performs a read in register file 100. At the X1 stage, the FADD instruction converts the operands obtained to internal format and starts the floating point operation. The floating point operation is continued at the X2 stage. At the WF stage, the result of the FADD instruction is rounded and reported back to register file 100 through a WF write port. At the ER stage, a status word register SW in the floating point unit is updated and errors are reported if there are any.

As a further example, an FLD instruction, which is a load from memory instruction, also starts at the D2 stage for decoding. At the E stage, memory is read to obtain the data to be loaded into register file 100. At the X1 stage, the data read is converted into internal precision and is written into register file 100 through an X1 write port. At the X2 and WF stages nothing happens. Finally, the status word register SW is updated in the ER stage and errors are reported if there are any.

When the floating point unit receives a floating point exchange FXCH instruction in parallel with another floating point instruction, the FXCH instruction is received in the v-pipe and the other instruction is received in the u-pipe. The other instruction must be an instruction other than the FXCH instruction. If the floating point unit receives an FXCH instruction in the u-pipe, its v-pipe will not receive another FXCH instruction in parallel. When an FXCH instruction is issued to the floating point unit in the v-pipe, an Fv bit (i.e., a certain field) in the micro-instruction word is set to "1" to indicate that the FXCH instruction is issued in the v-pipe in parallel with another instruction. The FXCH instruction will then be executed in parallel with the other instruction inside the floating point unit, but maintaining a conceptual sequence.

It is important to note that although internally the FXCH instruction is executed in parallel with another floating point instruction that is issued in parallel with the FXCH instruction, the instructions are executed as if they were in the conceptual sequence. This means that the FXCH instruction does not affect the execution of the other floating point instruction which is being executed in parallel with the FXCH instruction.

As described above, the floating point unit of the microprocessor of the presently preferred embodiment includes pointer table register file 34 of FIG. 3. In the presently preferred embodiment, the parallel issued FXCH instruction in the v-pipe to the floating point unit is executed in pointer table register file 34 while the u-pipe instruction is concurrently executed in the floating point unit. The parallel exchange instruction execution will be described in more detail below, in conjunction with FIGS. 3 through 6c.

In FIG. 3, floating point register file 100 includes a stack physical register file 32. Physical register file 32 includes sixteen data registers $R_0$ through $R_{15}$. Alternatively, register file 32 may include more or fewer than sixteen data registers. Each of data registers $R_0$–$R_{15}$ is eighty-six bits wide. The top eight data registers $R_0$–$R_7$ are employed as stack registers.

Each of data registers $R_0$–$R_{15}$ is divided into fields corresponding to extended precision real data type. The bottom eight data registers $R_8$–$R_{15}$ are directly addressable registers. The top eight data registers $R_0$–$R_7$ are always accessed as a stack. Data registers $R_0$–$R_{15}$ are employed to store operands and results for instructions executed in the floating point unit.

Floating point register file 100 also includes a pointer table register file 34. Pointer table register file 34 is coupled to physical register file 32 via address buses 75 through 77. Address buses 75–77 include a first source SRC1 address bus 75, a second source SRC2 address bus 76, and a destination DST address bus 77. DST address bus 77 includes two address uses, one for an $X_1$ DST address and the other for a WF DST address. Pointer table register file 34 includes eight pointer registers PT0 through PT7, each being three bits wide. Alternatively, pointer register file 34 may have more or fewer than eight pointer registers. The number of the pointer registers in pointer table register file 34 depends on the number of the data registers in physical register file 32 that form the stack registers.

Each of pointer registers PT0–PT7 of pointer table register file 34 stores a physical register address of one of stack registers ST0–ST7. In this case, each of pointer registers PT0–PT7 of pointer table register file 34 points to one of data registers $R_0$–$R_7$ of physical register file 32. The address of each of data registers $R_0$–$R_7$ is always stored only in one of pointer registers PT0–PT7. Upon initialization of pointer table register file 34, the PT0 register contains the address (000) of the $R_0$ register. The PT1 register contains the address (001) of the $R_1$ register. The PT2 register contains the address (010) of the $R_2$ register, etc. Any stack access to one of data registers $R_0$–$R_7$ needs to be made indirectly first to pointer registers PT0–PT7 of pointer table register file 34 in order to obtain the address of that data register.

Pointer table register file 34 provides indirection which allows physical register file 32 to lie (or be laid out) as a flat register file while still being able to be accessed as a stack by each instruction.

Floating point register file 100 also includes a tag register file 36. The TAG word marks the content of each numeric data register. Each 1-bit tag corresponds one of data registers $R_0$–$R_7$. The TAG word uses this one bit for indicating empty or full of its corresponding data register.

TAG register file 36 is coupled to a tag decoding logic 49 for reading and writing into TAG register file 36. The reading and writing or checking and setting of TAG register file 36 from tag decoding logic 49 is controlled by microcontrol directives FSET field 41 and FCHK field 43 of an instruction microcontrol vector supplied by the bus. FSET field 41 provides a three-bit control directive. This directly controls the setting of the source operand and destination operand TAG registers as full or empty. The TAGs are only set after the FCHK directive has yielded no stack exceptions. FCHK field 43 reads or checks TAG values of pointer table register file 34 to determine if a stack underflow or stack overflow will occur due to the present instruction. FCHK field 43 provides a three-bit field which is able to check eight different conditions.

Pointer registers PT0–PT7 of pointer table register file 34 are connected to a u-pipe address generator 47. U-pipe address generator 47 includes three adders 56, 58, and 60, each being coupled to receive one of three u-SRC1, u-SRC2, and u-DST microcontrol address fields 40, 42, and 44 of a single instruction from the u-pipe bus. The u-SRC1 field 40 contains either an offset for addressing one of pointer registers PT0–PT7 which points to one of data registers $R_0$–$R_7$ that contains a first operand of a floating point instruction or contains the address of one of registers $R_8$–$R_{15}$. The u-SRC2 field 42 likewise contains another offset or address of register for addressing another one of pointer registers PT0–PT7 which points to another one of data registers $R_0$–$R_7$ that contains a second operand of the instruction or the u-SRC2 field 42 contains the address of one of the registers $R_8$ through $R_{15}$. The u-DST field 44 contains a third offset for addressing one of pointer registers PT0–PT7 which points to one of data registers $R_0$–$R_7$ that will store the result of the instruction executed or u-DST contains an address to registers $R_8$–$R_{15}$. In u-pipe address generator 47, these offsets are added to a top of stack address from a top of stack generator 46. As can be seen from FIG. 3, u-SRC1 field 40 is coupled to adder 56, u-SRC2 field 42 is coupled to adder 58, and u-DST field 44 is coupled to adder 60. Each of adders 56, 58, and 60 are also coupled to top of stack generator 46. Adder 56 generates an SRC1 pointer table address which is coupled to pointer table register file 34 via address bus 72. Adder 58 generates an SRC2 pointer table address which is coupled to pointer table register file 34 via address bus 73. Adder 60 generates a DST pointer table address which is coupled to pointer table register file 34 via address bus 74. The DST pointer table address includes an $X_1$ DST pointer table address and a WF DST pointer table address. Address bus 74 thus includes two address buses, one for the $X_1$ DST pointer table address and the other for the WF DST pointer table address.

Addressed by the SRC1, SRC2, and DST pointer table addresses via address buses 72–74, pointer table register file 34 couples three addresses to physical register file 32 via address buses 75–77 from three of its pointer registers PT0–PT7. The addresses that are coupled to physical register file 32 are an SRC1 address, an SRC2 address and the $X_1$ and WF DST addresses. The SRC1 address accesses one of data registers $R_0$–$R_7$ for the first operand of the instruction. The SRC2 address accesses another one of data registers $R_0$–$R_7$ for the second operand of the instruction. The $X_1$ or the WF DST address accesses one of data registers $R_0$–$R_7$ for storing the result of the instruction executed. The operands are sent to the floating point execution units of the floating point unit via bus 63 and the result is received from the floating point execution units via bus 64.

Pointer table register file 34 is also coupled to a v-pipe address generator 45. V-pipe address generator 45 includes an adder 62 and two multiplexers 51 and 53. Adder 62 is coupled to a v-SRC2 microcontrol address field 50 of a single FXCH instruction from the v-pipe bus. The v-SRC2 field 50 provides a second source for the FXCH instruction. Another source of the FXCH instruction is provided by top of stack address generator 46. Top of stack address generator 46 is also coupled to v-pipe address generator 45. Multiplexers 51 and 53 of v-pipe address generator 45 receive their inputs from top of stack address generator 46, adder 62, and address buses 72 and 73. Multiplexers 51 and 53 are controlled by the Fv bit field 55 of the FXCH instruction. If the Fv bit is "1", the outputs from adder 62 and top of stack address generator 46 are applied to the outputs of multiplexers 51 and 53. If the Fv bit is "0", it means there is no FXCH instruction issued in the v-pipe bus and the outputs of the SRC1 and SRC2 pointer table addresses are coupled to the outputs of multiplexers 51 and 53. The output of multiplexer 51 is an EXCH1 pointer table address. The output of multiplexer 53 is an EXCH2 pointer table address. The EXCH1 and EXCH2 pointer table addresses point to two of pointer registers PT0–PT7 of which the contents are exchanged. The exchange operation will be described in more detail below.

Top of stack address generator 46 provides an updated top of stack address. Top of stack generator 46 includes a top of stack TOS register 48 which stores the current top of stack address of pointer table register file 34. Instructions may address data registers $R_0$–$R_7$ relative to the top of stack address. Many instructions operate on the data register which is currently at the top of stack. These instructions implicitly address the data register to which the current top of stack address points. Other instructions may specify which register to use relative to the top of stack address. Some instructions access registers $R_8$–$R_{15}$ directly (no stack or pointer indirection is involved).

Top of stack address generator 46 is coupled to receive an FTOS field 39 of a microcontrol vector from the bus. FTOS field 39 is a two-bit field which provides control directives for updating TOS register 48 (i.e., the top of stack component in the status word). The update of TOS register 48 is done on top of stack address generator 46. Top of stack address generator 46 includes a TOS decoder 52 coupled to receive a two-bit input from FTOS field 39. The two-bit input from FTOS field is decoded into a +2, +1, 0, or −1 which is applied to one input of a two-input adder 54. The second input of adder 54 receives the current top of stack address from TOS register 48. The two inputs are added in adder 54 to provide the new top of stack address to TOS register 48.

As stated above, when an FXCH instruction is issued in parallel with another instruction, the FXCH instruction is received in the v-pipe bus while the other instruction is received in the u-pipe bus. V-pipe address generator 45 then generates the EXCH1 and EXCH2 pointer table addresses to pointer table register file 34 while u-pipe address generator 47 generates SRC1, SRC2, and DST pointer table addresses to pointer table register file 34. Since the FXCH instruction is issued in parallel, the Fv bit field 55 causes multiplexers 51 and 53 to couple the top of stack address from top of stack address generator 46 and the output of adder 62 to become the EXCH1 and EXCH2 pointer table addresses. If no parallel FXCH instruction is issued in the v-pipe, multiplexers 51 and 53 couple the SRC1 and SRC2 pointer table addresses to buses 70 and 71, respectively.

The EXCH1 and EXCH2 pointer table addresses access two of pointer registers PT0–PT7 and read the contents stored in these two registers out. The contents read are then coupled back to these two pointer registers via EXCH1 and EXCH2 content lines. The contents read are then written into these two pointer registers with their position exchanged. For example, if an FXCH instruction issued in parallel is to exchange a first address stored in PT3 register with a second address stored in PT5 register, the EXCH1 pointer table address on bus 70 accesses PT3 register for the first address which is read out via the EXCH1 content line 78. Likewise, the EXCH2 pointer table address on bus 71 accesses PT5 register for the second address which is read out via the EXCH2 content line 79. The EXCH1 content line 78 then couples the first address to PT5 register and the EXCH2 content line 79 couples the second address to PT3 register. The exchange operation will be described in more detail below, in conjunction with FIG. 4.

Figure 4:
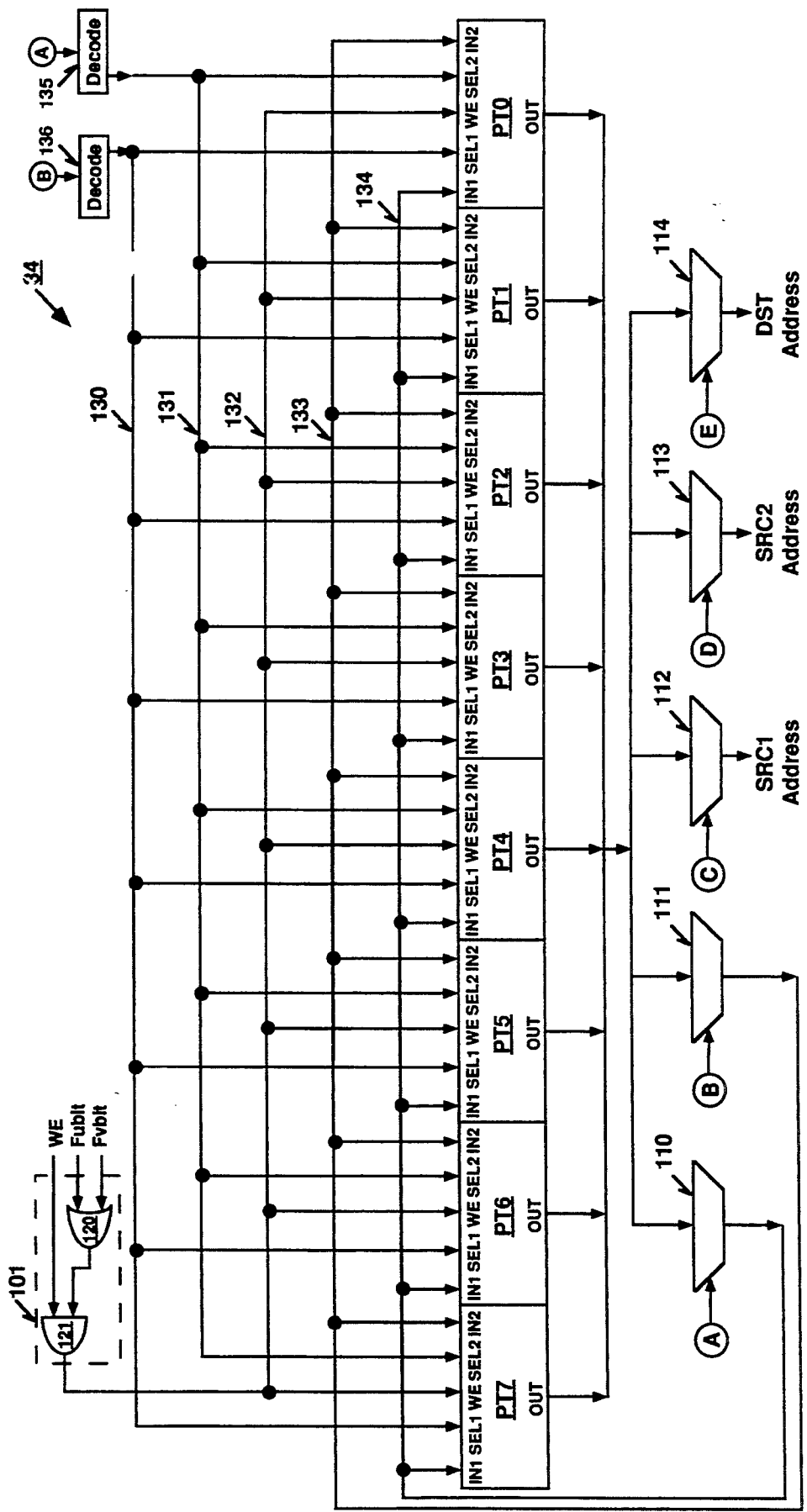
FIG. 4 is a block diagram of five read ports and two write ports of the pointer table of FIG. 3.

FIG. 4 illustrates in block diagram form five read ports 110 through 114 and two write ports associated with pointer register PT0-PT7 of pointer table register file 34 of FIG. 3 for the parallel execution of instructions. In FIG. 4, each of read ports 110-114 is controlled by one of address buses 70-74 to read the address stored in one of pointer register PT0-PT7. Read ports 112-114 are controlled by SRC1, SRC2, and DST pointer table addresses via buses 72-74, respectively, to read the SRC1, SRC2, and DST address to physical register file 32 from three of pointer registers PT0-PT7. Read ports 110 and 111 are employed for the parallel execution of the FXCH instruction. Read ports 110 and 111 are controlled by the EXCH1 and EXCH2 pointer table addresses from buses 70 and 71 to read two addresses from two of pointer registers PT0-PT7 for the exchange operation. The outputs of read ports 110-111 are coupled to pointer registers PT0-PT7.

As can be seen from FIG. 4, each of pointer registers PT0-PT7 includes a first input IN1 and a second input IN2. The IN1 input is controlled by a SEL1 select input and the IN2 input is controlled by a SEL2 select input. The IN1 input of each of pointer registers PT0-PT7 is coupled to the output of read port 110. The IN2 input of each of pointer registers PT0-PT7 is coupled to the output of read port 111. The SEL1 input of each pointer register is coupled to a decoder 136 (i.e., write port) which receives the EXCH2 pointer table address. Decoder 136 is a three-to-eight decoder and receives a three bit EXCH2 pointer table address. Line 130 couples the result of decoder 136 to one of pointer registers PT0-PT7. Line 130 includes eight signal lines, each being coupled to the SEL1 input of a pointer register.

Similarly, the SEL2 input of each pointer register is coupled to a decoder 135 (i.e., write port) which receives a three-bit EXCH1 pointer table address. Decoder 135 is a three-to-eight decoder and generates an SEL2 signal to one of pointer registers PT0-PT7 via line 131. Line 131 has eight signal lines, each being coupled to the SEL2 input of one of pointer registers PT0-PT7.

During execution of the FXCH instruction in either the u-pipe or the v-pipe, read port 110 is controlled by the EXCH1 pointer table address to read the content (i.e., address) of one of pointer registers PT0-PT7 and read port 111 is controlled by the EXCH2 pointer table address to read the content (i.e., address) of another one of pointer registers PT0-PT7. The content read by read port 110 under the EXCH1 pointer table address is coupled to the IN1 input of each of registers PT0-PT7. The write of the content from read port 110 into which pointer register is controlled by the SEL1 signal which is generated from the EXCH2 pointer table address. Likewise, the content read by read port 111 under EXCH2 pointer table address is coupled to the IN2 input of each of registers PT0-PT7. The write of the content from read port 111 into which pointer register is controlled by the SEL2 signal which is generated from the EXCH1 pointer table address. For example, when an FXCH instruction issued in parallel to floating point register file 100 (FIG. 3) wants to exchange the address stored in pointer register PT4 with the address stored in pointer register PT6, the EXCH1 pointer table address controls read port 110 to read a first address from PT4 register and the EXCH2 pointer table address controls read port 111 to read a second address from PT6 register. The first address is then applied to the IN1 input of each of pointer registers PT0-PT7. The EXCH2 pointer table address applied at decoder 136 then generates the corresponding SEL1 signal for PT6 register to write the first address of the IN1 input into PT6 register. The second address from read port 111 is then applied to the IN2 input of each of pointer registers PT0-PT7. The EXCH1 pointer table address applied at decoder 135 then generates the corresponding SEL2 signal for PT4 register to write the second address at the IN2 input into PT4 register. In this way, the exchange is accomplished in pointer table register file 34 can be executed and in parallel with the execution of another instruction.

Each of pointer registers PT0-PT7 also includes a write enable input WE. The WE input is coupled to a write enable logic 101 via line 132. The WE input signal controls the write of each of pointer registers PT0-PT7. If there is no exchange instruction, the write enable logic does not generate the WE signal and none of pointer registers PT0-PT7 is allowed to be written into.

Therefore, parallel execution of instructions is made possible in floating point register file 100 of FIG. 3 in the pipelined microprocessor which eliminates the top of stack bottleneck. As can be seen from FIGS. 3 and 4, point table register file 34 provides indirect addressing of stack physical register file 32, which makes it possible to exchange stack positions of data before instructions reach the final stage of the execution pipeline. The five read ports 110-114 and the two write ports 115 and 116 associated with pointer table register file 34 make it possible for an FXCH instruction to be overlapped in execution with its preceding instruction. It allows concurrent execution of instructions in which one instruction is the FXCH instruction. The FXCH instruction is performed in pointer table register file 34 at the time its previous instruction is being executed. This is essential for microprocessors which have stack organized data registers and pipelined execution units.

As mentioned above, the error conditions of a given instruction in the pipelined microprocessor is not available until the ER state of the execution pipeline. However, with pointer table register file 34, the FXCH instruction is executed in registers of pointer table register file 34, rather than in registers of stack physical register file 32. With read ports 110-114 and write ports 115 and 116, the FXCH instruction is executed in parallel with its preceding instruction. In this case, there is no dependency between the FXCH instruction and its preceding instruction.

FIG. 5 illustrates an example (Example A) of an instruction stream which are overlapped in execution, wherein the instructions are issued individually in the u-pipe. The instruction stream is as follows:

Example A

| FADD | ST0, ST1 |
|------|----------|
| FXCH | ST0, ST2 |
| FSTP | memory   |

As can be seen from FIG. 5, the FADD instruction begins at clock 1 and the FXCH instruction can begin at clock 2. The FXCH instruction does not have to stall for the result of the FADD instruction to be stored in the data register which is currently considered the top of stack register. As is known from FIGS. 3 and 4 and their descriptions, the FXCH instruction is only executed in pointer table register file 34. This allows the FXCH instruction to begin at clock 2 without stalling for the result of the FADD instruction. In this way, instruction throughput of the pipelined microprocessor is one instruction per clock.

FIGS. 6a–6d schematically illustrate register file 100 of FIG. 3 during the parallel execution of the instruction stream of FIG. 5. FIG. 6a illustrates the state of register file 100 (FIG. 3) before the execution of the FADD instruction. FIG. 6b and FIG. 6c illustrate the state of register file 100 before the FSTP instruction writes its data to memory. FIG. 6d illustrates the state of register file 100 when the execution of the FSTP instruction is complete.

In FIG. 6a, for example, a stack of data (e.g., operands) A, B, C, and D is shown to be stored in physical register file 32. Data A, B, C, and D are organized in stack format with data A being at the top of stack position ST0, data B being in the ST1 stack position (i.e., one stack position below the top of stack), data C being in the ST2 stack position (i.e., two stack positions below the top of stack), data D being in the ST3 stack position (i.e., three stack positions below the top of stack). Before the FADD instruction enters the $D_2$ stage of the execution pipeline from the u-pipe, pointer table register file 34, stack physical register file 32, and TOS component 48 of the status word may contain data as illustrated in FIG. 6a. In FIG. 6a, data A is stored in register $R_4$ of physical register file 32. The address (100) of register $R_4$ is then contained in pointer register PT4 of pointer table register file 34. The address (100) of pointer register PT4 is contained in TOS component 48 of the status word since register $R_4$ is considered the current top of stack register.

Similarly, data B is stored in register $R_5$ of physical register file 32. The address (101) of register $R_5$ is contained in pointer register PT5 of pointer table register file 34. Since register $R_5$ is considered the current ST1 register, the address (101) of pointer register PT5 is derived from the top of stack address contained in TOS component 48 added with the offset of the stack position. In this case, the offset is 1 and the top of stack address is (100). Thus, the address of pointer register PT2 is (101).

The FADD ST0, ST1 instruction, by definition, adds data A in stack position ST0 to data B in stack position ST1. The result of the addition is then returned to stack position ST0 (i.e., register $R_4$). The FXCH ST0, ST2 instruction, by definition, exchanges the result of the FADD instruction in stack position ST0 with data C in stack position ST2. The FSTP instruction then stores to memory data C in stack position ST0.

As stated above, the result of the FADD instruction is not available until the FADD instruction reaches the WF stage of the execution pipeline (FIG. 5). Also as stated above, pointer table register file 34 provides indirect addressing to physical register file 32. Therefore, the stack positions can be switched prior to receiving the results of previous instructions. In this case, the exchange operation is performed without actually exchanging the data stored in physical register file 32. The FXCH instruction only switches the physical register addresses in pointer table register file 34. The FXCH instruction needs not wait for the result of its previous instruction to be written to the physical register in physical register file 32 before the exchange can be made. Also, the previous instruction can still store its result back to where the result is initially determined to be stored. In this case, the FXCH instruction can enter the execution pipeline before the result of the FADD instruction is stored back in stack position ST0 (i.e., the $R_4$ register). In this way, the FXCH instruction is overlapped in execution with the FADD instruction.

FIGS. 6b and 6c illustrate the overlapped execution of the FXCH instruction with the FADD instruction. In FIG. 6b, the FXCH instruction exchanges the stack positions of data C and the result of the FADD instruction before the result is stored in register $R_4$. The $R_4$ register is considered the top of stack register ST0 before the exchange operation. After the FADD instruction addresses the $R_4$ and $R_5$ registers (i.e., stack registers ST0, ST1 for data A and B), the FXCH instruction executes the exchange operation concurrently with the execution of the FADD instruction. At this time, register $R_4$ does not yet contain the result of the FADD instruction (i.e., it has unknown data denoted by "?"), and register $R_6$ stores data C. The stack position after the FADD instruction but before the FXCH instruction is shown in FIG. 6b.

Referring to FIG. 6c, the FXCH instruction execution is performed. Because it is impossible to exchange data C in register $R_6$ with an unknown data "?" in register $R_4$, the FXCH instruction exchanges the addresses in pointer register PT4 and PT6 such that pointer register PT4, which is pointed by TOS component 48, stores the address (110) of physical register $R_6$ and pointer register PT6 stores the address (100) of physical register $R_4$. In this case, pointer register PT4 points to physical register $R_6$ and pointer register PT6 points to physical register $R_4$. As can be seen from FIG. 6c, pointer register PT4 is currently pointed by TOS component 48 to store the address of the top of stack register. Data C is thus "moved" to the top of stack position ST0 although data C remains in register $R_6$ during the FXCH exchange operation. Register $R_4$ is still reserved to store the result of the FADD instruction during the FXCH exchange operation. The stack position of register $R_4$, however, is "moved" to the ST2 stack position. The new stack positions are as shown in FIG. 6c.

As shown in FIG. 6c, data C is now in the top of stack position register ST0, and the unknown data (?) of the FADD instruction is now in the ST2 stack position. When the result of the FADD instruction is finally available, it is written into register $R_4$ as previously determined without causing any confusion.

As data C is currently stored in the top of stack position ST0, it can be stored into memory by the FSTP instruction. The FSTP instruction then accesses the $R_6$ register via pointer register PT4 and TOS component 48 to read data C and store the data into memory. The execution of the FSTP instruction is concurrently with the execution of the FADD instruction and the FXCH instruction, as shown in FIG. 5.

FIG. 6d illustrates the state of TOS component 48, pointer table register file 34, and physical register file 32 when the execution of the instruction stream shown in FIG. 5 is complete. As can be seen in FIG. 6d, the FADD instruction stores the result X of the FADD instruction back to the R4 register which is pointed by pointer register PT3. TOS component 48 of the status word is updated as the result of the execution of the FSTP instruction. TOS component 48 is updated to currently point to pointer register PT5 which contains the address (101) of data register $R_5$. Register $R_5$ contains data B which, after the FSTP instruction execution, is the new top of stack ST0. The stack position of the PT6 pointer register is now changed to the ST1 stack position. In this case, the new stack is data B, X, and D with data B being the top of stack, data X being in the ST1 stack position and data D being in the ST2 stack position.

FIG. 7 illustrates an example of the parallel execution of the instruction stream described above, in connection with FIG. 5, wherein the FXCH instruction is issued in the v-pipe in parallel with the FADD instruction issued in the u-pipe. FIG. 7 illustrates the true benefit of the arrangement, which is when the FXCH instruction is issued in the v-pipe in parallel with other floating point instructions in the u-pipe. In FIG. 7, the same example A is employed and the FXCH instruction is issued in the v-pipe at the same time when the FADD instruction is issued in the u-pipe. In the preferred embodiment, the improved throughput in instruction execution is shown in FIG. 7, which is only an example of the present invention.

In the foregoing specification, the invention has been described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A data register file system in microprocessor having a pipelined execution unit that employs the data register file to store operands and results of its instruction executions, comprising:

a plurality of data registers, wherein each of the data registers can store one of the operands and results;

pointer table register having a plurality of pointer registers, each for storing an address of one of the data registers;

first address generation circuitry coupled to the pointer table register and the pipelined execution unit for generating a first set of pointer table addresses to access a first group of the pointer registers for the addresses of a first group of the data registers whose contents are required by the execution of a first instruction in the pipelined execution unit, wherein the first address generation circuitry receives a first instruction address of the first instruction from the pipelined execution unit to generate the first set of pointer table addresses;

second address generation circuitry coupled to the pointer table register and the pipelined execution unit for generating a second set of pointer table addresses to access a second group of the pointer registers for the addresses of a second group of the data registers whose contents are required by the execution of a second instruction in the pipelined execution unit, wherein the second address generation circuitry receives a second instruction address of the second instruction from the pipelined execution unit to generate the second set of pointer table addresses, wherein the second instruction is an exchange instruction that requires an exchange of the contents stored within the second group of the data registers;

circuitry coupled to the pointer table register and the data registers for coupling the addresses of the first group of the data registers stored in the first group of the pointer registers to the data registers for accessing the first group of the data registers;

read circuitry coupled to the pointer table register for reading the addresses of the second group of the data registers stored in the second group of the pointer registers; and exchange circuitry coupled to the read circuitry for exchanging the addresses read from the second group of the pointer registers and writing the addresses exchanged back to the second group of the pointer registers while the contents stored within the second group of the data registers remain not exchanged, wherein the second group of the pointer registers include a first pointer register and a second pointer register, wherein the exchange circuitry stores (1) the address read from the first pointer register into the second pointer register and (2) the address read from the second pointer register into the first pointer register, wherein the second instruction is executed in parallel with the first instruction.

2. The data register file system of claim 1, wherein the read circuitry further includes a first read port and a second read port, wherein the coupling circuitry further comprises a third read port, a fourth read port and a fifth read port, wherein the exchange circuitry further includes a first write port and a second write port coupled to the pointer table register.

3. The data register file system of claim 1, wherein the first address generation circuitry receives the first instruction address through a first pipeline microcode control field and the second address generation circuitry receives the second instruction address through a second pipeline microcode control field.

4. The data register file system of claim 3, wherein the second pipeline microcode control field includes a bit that indicates whether the second instruction is issued in parallel with the first instruction and to be executed in parallel with the first instruction.

5. The data register file system of claim 1, further comprising a top stack address generation circuit for generating a top of stack address to indicate a pointer register which is currently stack top in the pointer table register, wherein the top of stack address generation circuit is coupled to the first and the second address generation circuitry.

6. The data register file system of claim 5, wherein both the first group of the pointer registers and the second group of the pointer registers contain the pointer which is currently stack top.

7. The data register file system of claim 1, further comprising tag register circuitry having a plurality of tag registers, one for each of the pointer registers, wherein each of the tag registers indicates if its respective pointer register is full or empty.

8. The data register file system of claim 1, wherein the first instruction is not an exchange instruction, wherein when the first instruction is an exchange instruction that requires an exchange of contents of the first group of the data registers, the second address generation circuitry does not generate the second set of pointer table addresses based on the second instruction and the read circuitry reads the addresses stored in the first group of the pointer registers, wherein the exchange circuitry then exchanges the addresses read from the first group of the pointer registers and stores the addresses exchanged back to the first group of the pointer registers while the contents stored within the first group of the data registers are not exchanged.

9. A data register file system in a microprocessor having a pipelined execution unit that employs the data register file to store operands and results of its instruction executions, comprising:

a plurality of data registers, wherein each of the data registers can store one of the operands and results;

pointer table register means having a plurality of pointer registers, each for storing an address of one of the data registers;

first address generation means coupled to the pointer table register means and the pipelined execution unit for generating a first set of pointer table addresses to access a first group of the pointer registers for the addresses of a first group of the data registers whose contents are required by the execution of a first instruction in the pipelined execution unit, wherein the first address generation means receives a first instruction address of the first instruction from the pipelined execution unit to generate the first set of pointer table addresses;

second address generation means coupled to the pointer table register means and the pipelined execution unit for generating a second set for the addresses of a second group of the data registers whose contents are required by the execution of a second instruction in the pipelined execution unit, wherein the second address generation means receives a second instruction address of the second instruction from the pipelined execution unit to generate the second set of pointer table addresses, wherein the second instruction is an exchange instruction that requires an exchange of the contents stored within the second group of the data registers;

top of stack address generation means coupled to the first and the second address generation means for generating a top of stack address indicating a pointer register which is currently stack top to the first and the second address generation means, wherein both the first group of the pointer registers and the second group of the pointer registers contain the pointer register which is currently stack top;

means coupled to the pointer table register means and the data registers for coupling the addresses of the first group of the data registers stored in the first group of the pointer registers to the data registers for accessing the first group of the data registers;

read means coupled to the pointer table register means for reading the addresses of the second group of the data registers stored in the pointer register which is currently stack top and a second pointer register of the second group of the pointer registers; and exchange means coupled to the read means for exchanging the addresses read from the second group of the pointer registers and writing the addresses exchanged back to the second group of the pointer registers, wherein the exchange means stores (1) the address read from the pointer register which is currently stack top into the second pointer register and (2) the address read from the second pointer register into the pointer register which is currently stack top while the contents stored within the second group of the data registers remain not exchanged, wherein the second instruction is executed in parallel with the first instruction.

10. The data register file system of claim 9, wherein the read means further includes a first read port and a second read port, wherein the coupling means further includes a third read port, a fourth read port, and a fifth read port, wherein the exchange means further includes a first write port and a second write port coupled to the pointer table register means.

11. The data register file system of claim 9, wherein the first address generation means receives the first instruction address through a first pipeline microcode control field and the second address generation means receives the second instruction address through a second pipeline address bus.

12. The data register file system of claim 11, wherein the second pipeline microcode control field includes a bit that indicates whether the second instruction is executed in parallel with the first instruction.

13. The data register file system of claim 9, further comprising tag register circuitry having a plurality of tag registers, each for one of the pointer registers, wherein each of the tag registers indicates it its respective one of the pointer registers is full or empty.

14. The data register file system of claim 9, wherein the first instruction is not an exchange instruction, wherein when the first instruction is an exchange instruction that requires an exchange of the contents of the first group of the data registers, the second address generation means does not generate the second set of pointer table addresses based on the second instruction and the read means reads the addresses stored in the first group of the pointer registers, wherein the exchange means then exchanges the addresses read from the first group of the pointer register and stores the addresses exchanged back to the first group of the pointer registers while the contents stored within the first group of the data registers are not exchanged.

15. A method of executing an exchange instruction in parallel with other instructions in a microprocessor having a pipelined execution unit that employs a data register file to store operands and results of its instruction executions, wherein the data register file includes a plurality of data registers, the method comprising the steps of:

(A) providing pointer table register having a plurality of pointer registers, each for storing an address of one of the data registers;

(B) receiving a first instruction in a first address generation logic and the exchange instruction in a second address generation logic, wherein the first instruction is an instruction other than the exchange instruction;

(C) generating in the first address generation logic a first set of pointer table addresses to the pointer table register to access a first group for the addresses of a first group of the data registers whose contents are required for the execution of the first instruction in the pipelined execution unit, wherein the first group of the pointer registers include a pointer register pointed by a top of stack pointer;

(D) generating in the second address logic a second set of pointer table addresses to access a second group of the pointer registers for the addresses of a second group of the data registers whose contents are required for the execution of the exchange instruction, wherein the second group of pointer registers include the pointer register pointed by the top of stack pointer and a second pointer register, wherein the execution of the exchange instruction requires an exchange of the contents stored in the second group of the data registers;

(E) coupling the addresses of the first group of the data registers stored in the first group of the pointer registers to the data register file for accessing the first group of the data registers;

(F) reading the addresses of the second group of the data registers stored in the pointer register pointed by the top of stack pointer and the second pointer register of the second group of the pointer registers; and (G) exchanging the addresses read from the second group of the pointer registers and writing the addresses exchanged back to the second group of the pointer registers by (1) storing the address read from pointer register pointed by the top of stack pointer into the second pointer register; and (2) storing the address read from the second pointer register into the pointer register pointed by the top of stack pointer, wherein the contents of the second group of the data registers remain not exchanged, wherein the exchange instruction is executed in parallel with the first instruction.

16. The method of claim 15, wherein the steps (B) and (C) further comprise the step of generating a top of stack address indicating the pointer register pointed by the top of stack pointer.

17. The method of claim 15, wherein the step (C) further comprises the step of inhibiting the step (D) if the first instruction is an exchange instruction.

18. A data register file system in a microprocessor, comprising:

a plurality of data registers for storing data;

a pointer table register having a plurality of pointer registers, each for storing an address of one of the data registers;

first address generation circuitry coupled to the pointer table register for receiving a first instruction to generate a first set of pointer table addresses to access a first group of the pointer registers of the pointer table register for the addresses of a first group of the data registers whose contents are required by the first instruction;

second address generation circuitry coupled to the pointer table register for receiving a second instruction to generate a second set of pointer table addresses to access a second group of the pointer registers of the pointer table register for the addresses of a second group of the data registers whose contents are required by the second instruction, wherein the second instruction is an exchange instruction that requires an exchange of the contents stored within the second group of the data registers;

exchange circuitry coupled to the pointer table register for exchanging the addresses of the second group of the data registers stored in the second group of the pointer registers while the contents of the second group of the data registers remain not exchanged, wherein the second group of the pointer registers include a first pointer register and a second pointer register, wherein the exchange circuitry stores (1) the address read from the first pointer register into the second pointer register and (2) the address read from the second pointer register into the first pointer register, wherein the second instruction is executed in parallel with the first instruction.

19. The data register file system of claim 18, further comprising a coupling circuit coupled to the pointer table register and the data registers for coupling the addresses of the first group of the data registers stored in the first group of the pointer registers to the data registers for accessing the first group of the data registers.

20. The data register file system of claim 18, wherein the exchange circuitry further includes (i) a first read port and a second read port coupled to the pointer table register;

(ii) a first write port and a second write port coupled to the pointer table register.

21. The data register file system of claim 18, further comprising a top of stack address generation circuit for generating a top of stack address to indicate a pointer register which is currently stack top in the pointer table register, wherein the top stack address generation circuit is coupled to the first and the second address generation circuitry.

22. The data register file system of claim 21, wherein both the first group of the pointer registers and the second group of the pointer registers contain the pointer register which is currently stack top.

* * * * *

UNITED STATES PATENT AND TRADEMARK OFFICE
CERTIFICATE OF CORRECTION

PATENT NO. : 5,367,650

DATED : November 22, 1994

INVENTOR(S) : Harshvardhan P. Sharangpani and Jonathan B. Sweedler

It is certified that error appears in the above-indentified patent and that said Letters Patent is hereby corrected as shown below:

Title Page, item [54]  Delete "Apparauts" Insert in place thereof
--Apparatus--.

Signed and Sealed this

Third Day of October, 1995

Attest:

BRUCE LEHMAN

Attesting Officer     Commissioner of Patents and Trademarks